US012599059B2

(12) United States Patent 
Lynn

(10) Patent No.: US 12,599,059 B2 
(45) Date of Patent: Apr. 14, 2026

(54) ELECTRIC MOWER

(71) Applicant: KUBOTA CORPORATION, Osaka (JP)

(72) Inventor: Jordan Lynn, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 441 days.

(21) Appl. No.: 18/213,309

(22) Filed: Jun. 23, 2023

(65) Prior Publication Data

US 2024/0423125 A1 Dec. 26, 2024

(51) Int. Cl.
| | |
|---|---|
| *B60L 50/64* | (2019.01) |
| *A01D 34/66* | (2006.01) |
| *A01D 34/78* | (2006.01) |
| *B60K 1/04* | (2019.01) |
| *B60L 50/60* | (2019.01) |
| *B60R 21/13* | (2006.01) |
| *A01D 101/00* | (2006.01) |

(52) U.S. Cl.
CPC ............. *A01D 34/78* (2013.01); *A01D 34/66* (2013.01); *B60K 1/04* (2013.01); *B60L 50/66* (2019.02); *B60R 21/131* (2013.01); *A01D 2101/00* (2013.01); *B60K 2001/0422* (2013.01); *B60L 2200/40* (2013.01)

(58) Field of Classification Search
CPC ...... A01D 34/78; A01D 34/66; B60R 21/131; B60K 2001/0422
USPC ........................................................ 56/255
See application file for complete search history.

(56) References Cited

U.S. PATENT DOCUMENTS

| | | | | |
|---|---|---|---|---|
| 5,950,751 | A | * 9/1999 | McComber | .............. B62K 5/01 |
| | | | | 180/215 |
| 10,351,201 | B1 | * 7/2019 | Wright | ...................... B62J 7/06 |
| 2004/0154278 | A1 | * 8/2004 | Samejima | .............. A01D 34/64 |
| | | | | 56/14.7 |
| 2008/0264026 | A1 | * 10/2008 | Ishii | ......................... B60K 6/46 |
| | | | | 56/10.8 |
| 2011/0117419 | A1 | * 5/2011 | Lee | ..................... H01M 50/249 |
| | | | | 429/156 |
| 2011/0131942 | A1 | * 6/2011 | Sugio | ..................... A01D 34/71 |
| | | | | 56/320.2 |
| 2012/0247850 | A1 | * 10/2012 | Hashimoto | ......... H01M 50/224 |
| | | | | 180/68.5 |
| 2013/0168168 | A1 | * 7/2013 | Takagi | ..................... B60L 58/21 |
| | | | | 180/65.245 |
| 2015/0064541 | A1 | * 3/2015 | Noh | ..................... H01M 50/209 |
| | | | | 429/156 |
| 2015/0122563 | A1 | * 5/2015 | Kondo | .................. B62K 11/02 |
| | | | | 180/68.5 |
| 2016/0057924 | A1 | * 3/2016 | Asahara | ................. A01D 34/64 |
| | | | | 180/312 |
| 2018/0337374 | A1 | * 11/2018 | Matecki | ................... B60K 1/04 |
| 2020/0119417 | A1 | * 4/2020 | Masaryk | ........... H01M 10/6567 |
| 2020/0139802 | A1 | * 5/2020 | Nagasaka | ............ B60K 17/356 |

(Continued)

*Primary Examiner* — Claude J Brown 
(74) *Attorney, Agent, or Firm* — GREENBLUM & BERNSTEIN, P.L.C.

(57) ABSTRACT

An electric mower includes: a wheel; a body frame including a right frame portion and a left frame portion and supported by the wheel on ground; a battery between the right frame section and the left frame section in a plan view; and a plurality of plates supported by the body frame, spaced from each other in a front-back direction of the electric mower, and supporting the battery from below.

12 Claims, 6 Drawing Sheets

(56)         References Cited

U.S. PATENT DOCUMENTS

| | | | |
|---|---|---|---|
| 2020/0161728 A1* | 5/2020 | Wang ................ | H01M 10/6554 |
| 2020/0180417 A1* | 6/2020 | Marquez Duran ...... | B60K 1/04 |
| 2020/0243819 A1* | 7/2020 | Leal Rodriguez ...... | B60L 50/66 |
| 2020/0266496 A1* | 8/2020 | Podolefsky ......... | H01M 50/204 |
| 2020/0269929 A1* | 8/2020 | Shinohara .............. | B62D 21/18 |
| 2021/0022291 A1* | 1/2021 | Conrad ................ | A01D 34/685 |
| 2021/0170570 A1* | 6/2021 | Lee ........................ | B25J 9/0009 |
| 2022/0082146 A1* | 3/2022 | Shimooka ............. | F16F 1/3737 |
| 2022/0304226 A1* | 9/2022 | Yang ..................... | A01D 34/78 |
| 2022/0408638 A1 | 12/2022 | Ito et al. | |
| 2023/0031771 A1* | 2/2023 | Bell .................... | H01M 50/264 |
| 2023/0034464 A1* | 2/2023 | Matsunaga .............. | B60K 1/04 |

* cited by examiner

ELECTRIC MOWER

FIELD OF THE INVENTION

The present invention relates to an electric mower including a mower unit drivable by a motor.

BACKGROUND OF THE INVENTION

An electric mower includes wheels and a mower unit. The wheels are drivable on electric power from a battery for the electric mower to travel. The mower unit is also drivable on electric power from the battery to cut grass. As disclosed in US2022408638A1, an electric mower includes a battery at a back portion of its body.

There has been a demand for a battery with a large capacity for improvement of the efficiency in the mowing operation. This has in turn led to a need to place a large-sized battery on the body efficiently and mount the battery on the body accurately, that is, a need to efficiently and accurately mount components such as a battery on the body.

The present invention has an object of providing an electric mower including components mounted on its body efficiently and accurately.

SUMMARY OF THE INVENTION

An electric mower of the present invention includes: a wheel; a body frame including a right frame portion and a left frame portion and supported by the wheel on ground; a battery between the right frame section and the left frame section in a plan view; and a plurality of plates supported by the body frame, spaced from each other in a front-back direction of the electric mower, and supporting the battery from below.

The above configuration allows the battery to be supported by two or more plates and thereby allows the weight of the battery to be dispersed among those plates. If the battery is large, the plates share its heavy load, so that the load on each plate is smaller. The plates thus provide a strong and durable support, and are capable of supporting the battery more stably.

Further, with the plates spaced from each other, the space allows the battery to be cooled.

The electric mower may preferably include: a rollover protection structure fixed to the body frame at a position, wherein the plurality of plates include a first plate forward of the position and a second plate backward of the position.

The electric mower may preferably be configured such that the plurality of plates further include a third plate between the first plate and the second plate.

The electric mower may preferably be configured such that the plurality of plates further include a fourth plate at a back end portion of the body frame.

The electric mower may preferably be configured such that the battery is fixed to at least either of the second plate and the third plate with an elastic member in-between.

The electric mower may preferably be configured such that the battery is fixed to the first plate and the fourth plate with no elastic member in-between.

The electric mower may preferably be configured such that the body frame includes a back end section coupling a back end portion of the right frame section to a back end portion of the left frame section, and the fourth plate includes: a battery support section extending forward from the back end section; a hitch support section extending backward from the back end section; and an intermediate section disposed between the battery support section and the hitch support section and over the back end section.

The electric mower may preferably be configured such that the rollover protection structure includes: a right vertical section fixed to the right frame section; a left vertical section fixed to the left frame section; and a cross member coupling a lower portion of the right vertical section to a lower portion of the left vertical section.

The electric mower may preferably include: a driver's seat, wherein the battery is in a space extending from respective back end portions of the right frame section and the left frame section to below the driver's seat.

The electric mower may preferably include: a driver's seat, wherein the battery is in a space extending from respective back end portions of the right frame section and the left frame section to below the driver's seat and surrounded by the cross member and the plurality of plates.

The electric mower may preferably include: a mower unit disposed below the battery and capable of being lifted and lowered.

The electric mower may preferably be configured such that the battery is disposed toward a first side in a left-right direction of the electric mower, the electric mower further includes a holder device disposed between the battery and the body frame on a second side in the left-right direction and configured to temporarily hold the mower unit at a lifted position.

BRIEF DESCRIPTION OF THE DRAWINGS

The present disclosure is further described in the detail description which follows, in reference to the noted plurality of drawings by way of non-limiting examples of exemplary embodiments of the present disclosure, in which like reference numerals represent similar parts throughout the several views of the drawings, and wherein.

DETAILED DESCRIPTION OF THE INVENTION

Figure 1:
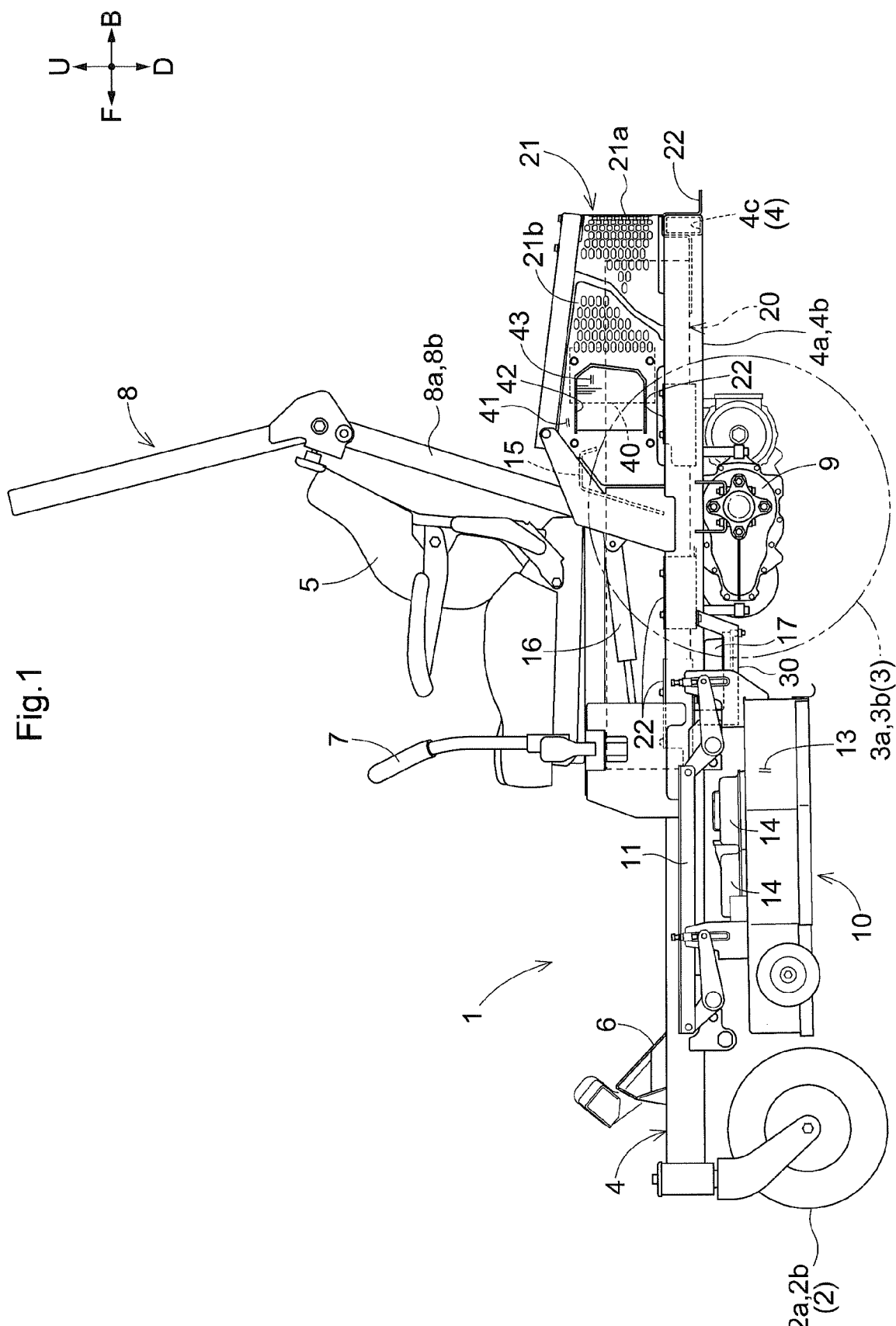
FIG. 1 is a side view of an electric mower.

The description below deals with an embodiment of the present invention with reference to drawings. Unless otherwise specified, the description below uses terms such as "front" and "forward" to refer to the direction indicated with arrow F in the drawings, terms such as "back" and "backward" to refer to the direction indicated with arrow B in the drawings, terms such as "left" and "leftward" to refer to the direction indicated with arrow L in the drawings, terms such as "right" and "rightward" to refer to the direction indicated with arrow R in the drawings, terms such as "above" and "upward" to refer to the direction indicated with arrow U in the drawings, and terms such as "below" and "downward" to refer to the direction indicated with arrow D in the drawings.

Overall Configuration of Electric Mower

Figure 2:
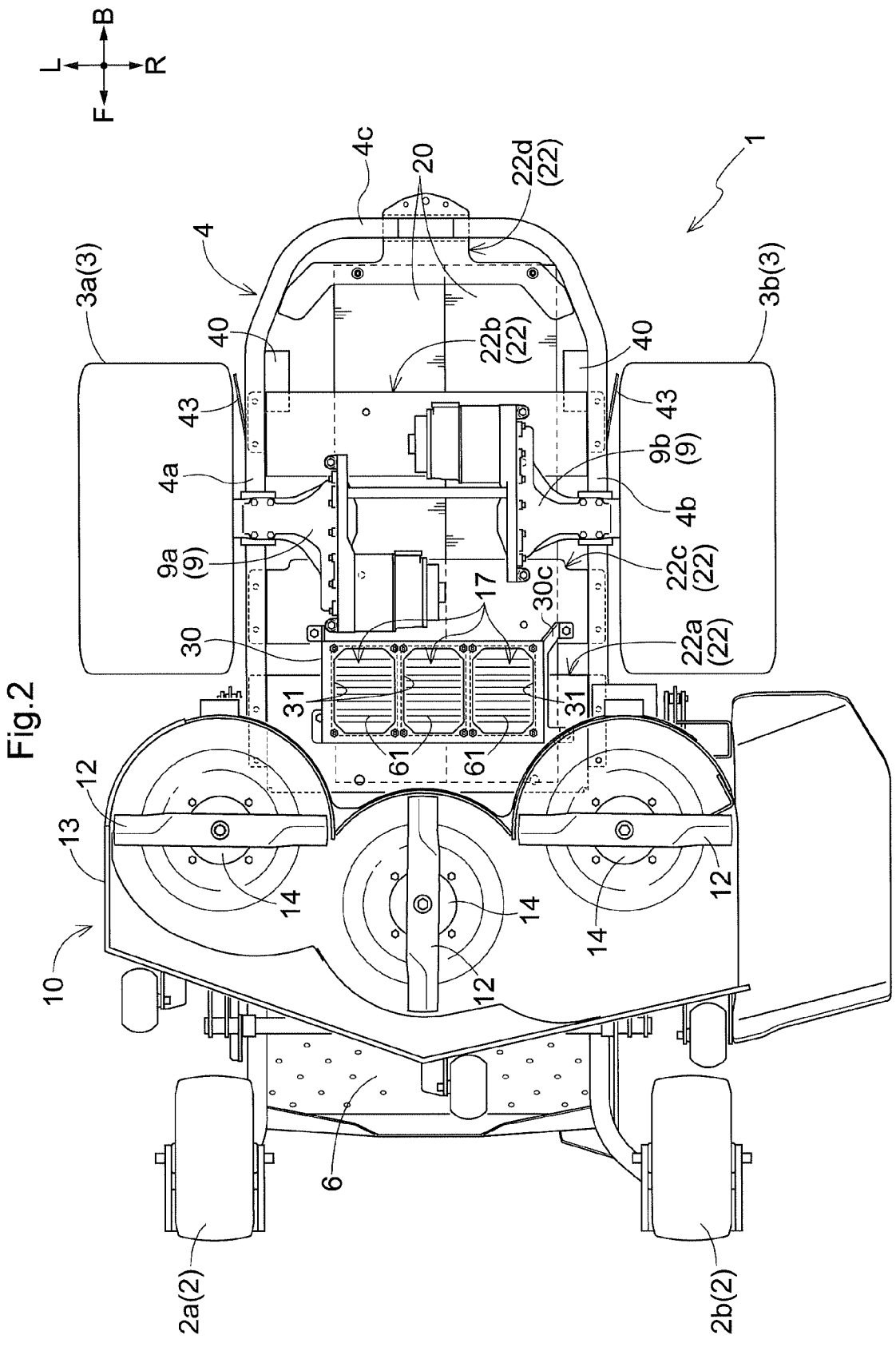
FIG. 2 is a bottom view of an electric mower.

The description below deals with an electric mower as an embodiment. As illustrated in FIGS. 1 and 2, the electric mower is of a riding type, and includes a body 1 provided with front wheels 2, drive wheels 3, and a body frame 4. The front wheels 2 are namely a left front wheel 2a and a right front wheel 2b each in the form of a rotatable caster. The drive wheels 3 are namely a left rear wheel 3a and a right rear wheel 3b. The body frame 4 is supported by the front wheels 2 and the drive wheels 3 on the ground. The body frame 4 includes a left frame section 4a, a right frame section 4b, and a back end section 4c coupling a back end portion of the left frame section 4a to a back end portion of the right frame section 4b.

The body 1 is provided with a driver's seat 5 on which an operator is able to sit. The body 1 is provided with a floor plate 6 in front of the driver's seat 5 on which floor plate 6 the operator is able to place their feet. The body 1 is provided with left and right control levers 7 to the left and right of the driver's seat 5. As illustrated in FIG. 2, the body 1 is provided with two drive wheel motors 9 configured to drive the respective drive wheels 3, namely, a motor 9a configured to drive the left rear wheel 3a and a motor 9b configured to drive the right rear wheel 3b. The operator is able to operate the control levers 7 to change the respective rotation speeds of the left rear wheel 3a and the right rear wheel 3b.

Figure 3:
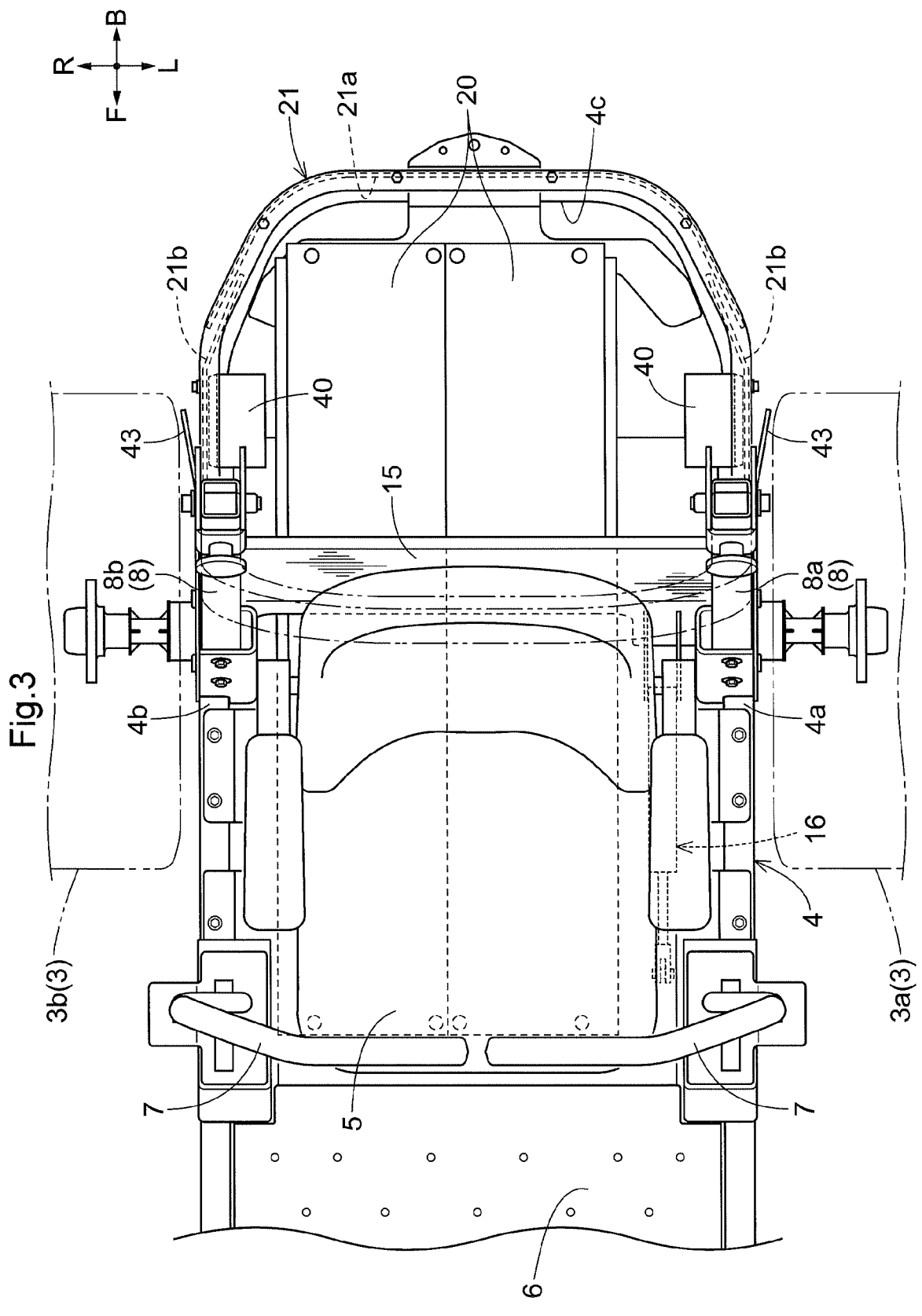
FIG. 3 is a plan view of a back portion of an electric mower.

As illustrated in FIGS. 1 and 3, the electric mower includes a rollover protection structure (ROPS) 8 disposed backward of the driver's seat 5 and fixed to the body frame 4. The ROPS 8 includes a left vertical section 8a fixed to the left frame section 4a, a right vertical section 8b fixed to the right frame section 4b, and a cross member 15 coupling a lower portion of the right vertical section 8b to a lower portion of the left vertical section 8a.

As illustrated in FIGS. 1 and 3, the electric mower includes a battery 20 in a space extending from respective back end portions of the left frame section 4a and the right frame section 4b to below the driver's seat 5. As illustrated in FIG. 3, the electric mower includes a cover 21 covering at least a portion of the battery 20. The cover 21 includes a back wall 21a backward of the battery 20 and a left side wall 21b and a right side wall 21b each extending forward from the back wall 21a. The battery 20 is between the left frame section 4a and the right frame section 4b in a plan view.

The battery 20 is disposed toward a first side (for the present embodiment, the right side) in the left-right direction of the electric mower between the left frame section 4a and the right frame section 4b. The electric mower includes a holder device 16 disposed between the battery 20 and the body frame 4 on a second side (for the present embodiment, the left side) in the left-right direction and configured to temporarily hold a mower unit 10 at its lifted position.

How Battery is Supported

Figure 4:
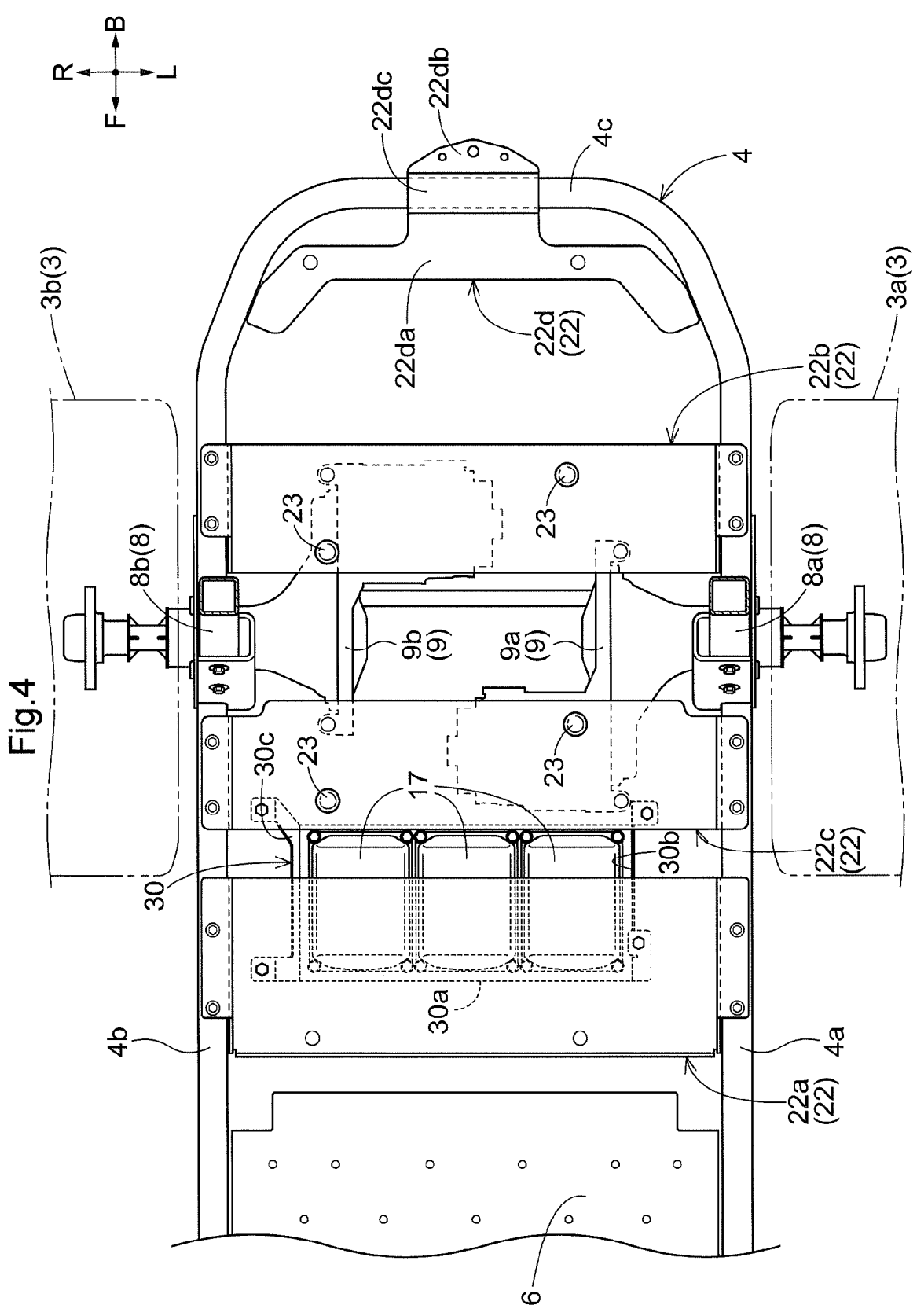
FIG. 4 is a view of elements supporting a battery from below.
Figure 5:
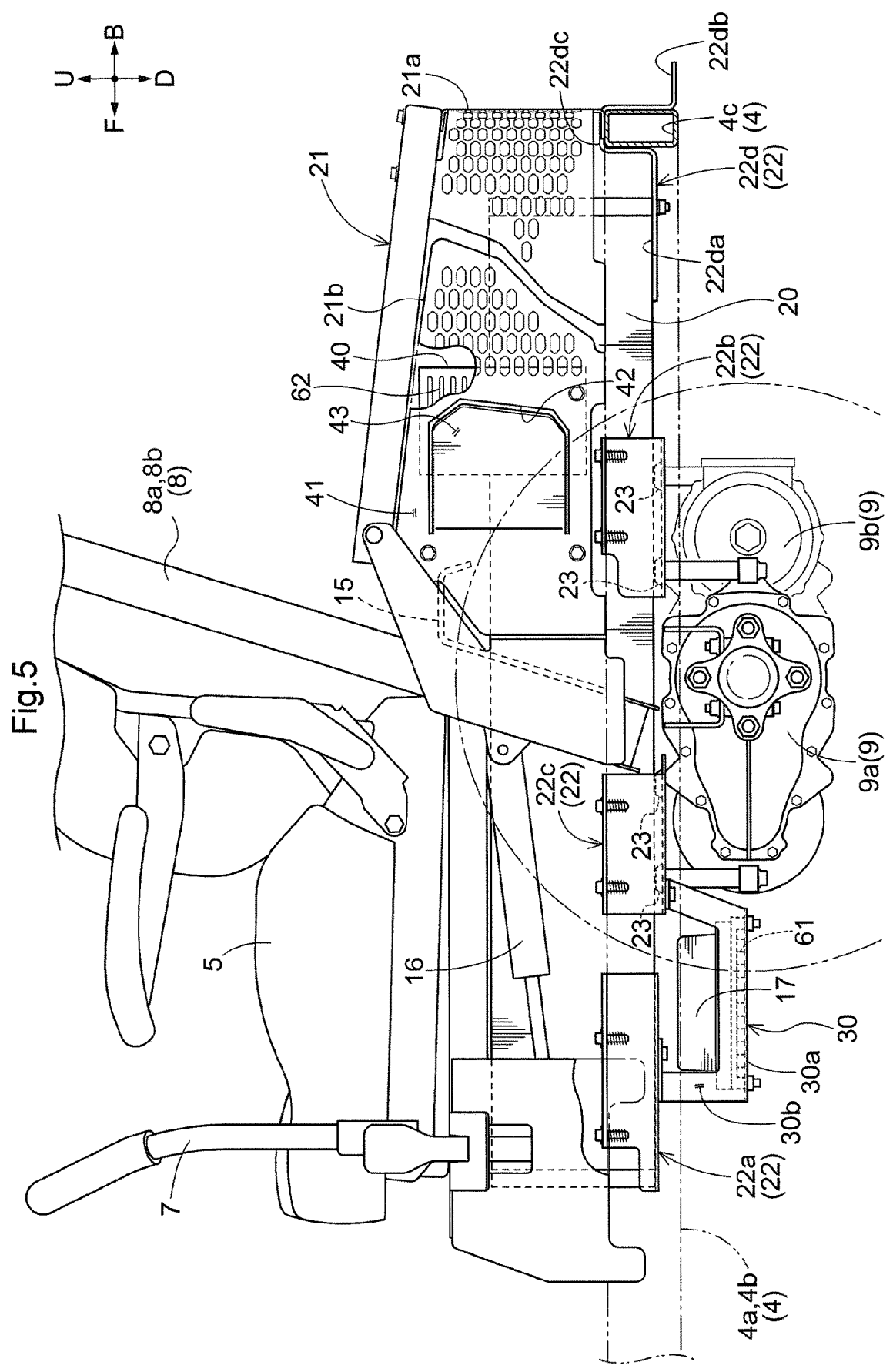
FIG. 5 is a side view of elements supporting a battery and a controller for a work motor and of a cover.

The electric mower includes two or more plates 22 supporting the battery 20 from below. As illustrated in FIGS. 4 and 5, the plates 22 includes a first plate 22a, a second plate 22b, a third plate 22c, and a fourth plate 22d. The plates 22 are supported by the body frame 4 and spaced from one another in the front-back direction of the electric mower. The battery 20 is bolted to the plates 22. The battery 20 is surrounded by the cross member 15 and the plates 22.

The first plate 22a is rectangular. The first plate 22a is forward of the position at which the ROPS 8 is coupled to the body frame 4, and supports a front end portion of the battery 20. The first plate 22a is bolted to the respective upper faces of the left frame section 4a and the right frame section 4b to be supported by the body frame 4.

The second plate 22b is rectangular. The second plate 22b is backward of the position at which the ROPS 8 is coupled to the body frame 4. The second plate 22b is bolted to the respective upper faces of the left frame section 4a and the right frame section 4b to be supported by the body frame 4.

The second plate 22b has an upper face provided with two elastic members 23 each made of rubber. The battery 20 is fixed to the second plate 22b with the elastic members 23 in-between. One of the elastic members 23 is on a front right portion of the second plate 22b, whereas the other elastic member 23 is on a back left portion of the second plate 22b.

The third plate 22c is rectangular. The third plate 22c is between the first plate 22a and the second plate 22b. The third plate 22c is bolted to the respective upper faces of the left frame section 4a and the right frame section 4b to be supported by the body frame 4.

Similarly to the second plate 22b, the third plate 22c has an upper face provided with two elastic members 23 each made of rubber. The battery 20 is fixed to the third plate 22c with the elastic members 23 in-between. One of the elastic members 23 is on a front right portion of the third plate 22c, whereas the other elastic member 23 is on a back left portion of the third plate 22c.

The fourth plate 22d is at a back end portion of the body frame 4. The fourth plate 22d is bolted to the upper face of the back end section 4c to be supported by the body frame 4.

The fourth plate 22d includes a battery support section 22da extending forward from the back end section 4c, a hitch support section 22db extending backward from the back end section 4c, and an intermediate section 22dc disposed between the battery support section 22da and the hitch support section 22db and over the back end section 4c. The battery support section 22da extends laterally as well to reach the left frame section 4a and the right frame section 4b. The battery support section 22da is under a back end portion of the battery 20.

Configuration of Mower Unit

The electric mower includes a mower unit 10 between the front wheels 2 and the drive wheels 3 and below the body 1. The mower unit 10 is suspended from the body 1 with use of a lifting and lowering link mechanism 11 in such a manner as to be capable of being lifted and lowered. The mower unit 10 is below the battery 20.

As illustrated in FIG. 2, the mower unit 10 includes three mower blades 12 and a mower cover 13 covering the mower blades 12 from above. The mower unit 10 includes three motors 14 provided for the respective mower blades 12 and drivable on electric power from the battery 20. The mower unit 10 is drivable by the motors 14.

The mower unit 10 includes three controllers 17 configured to control the respective motors 14. The controllers 17 for the present embodiment are each an inverter configured to convert electric current from the battery 20 into a three-phase alternating current with a predetermined frequency and supply the alternating current to the corresponding motor 14, which is thereby driven in accordance with the frequency. The battery 20, the controllers 17, and the motors 14 are connected to one another with use of a harness or the like (not illustrated in the drawings).

The mower unit 10 includes two or more (for the present embodiment, three) combinations of mower blades 12, motors 14, and controllers 17. The controllers 17 are arranged in the direction of the width of the electric mower, and are fixed to the body 1 with use of a support member 30.

How Controllers are Supported

Figure 6:
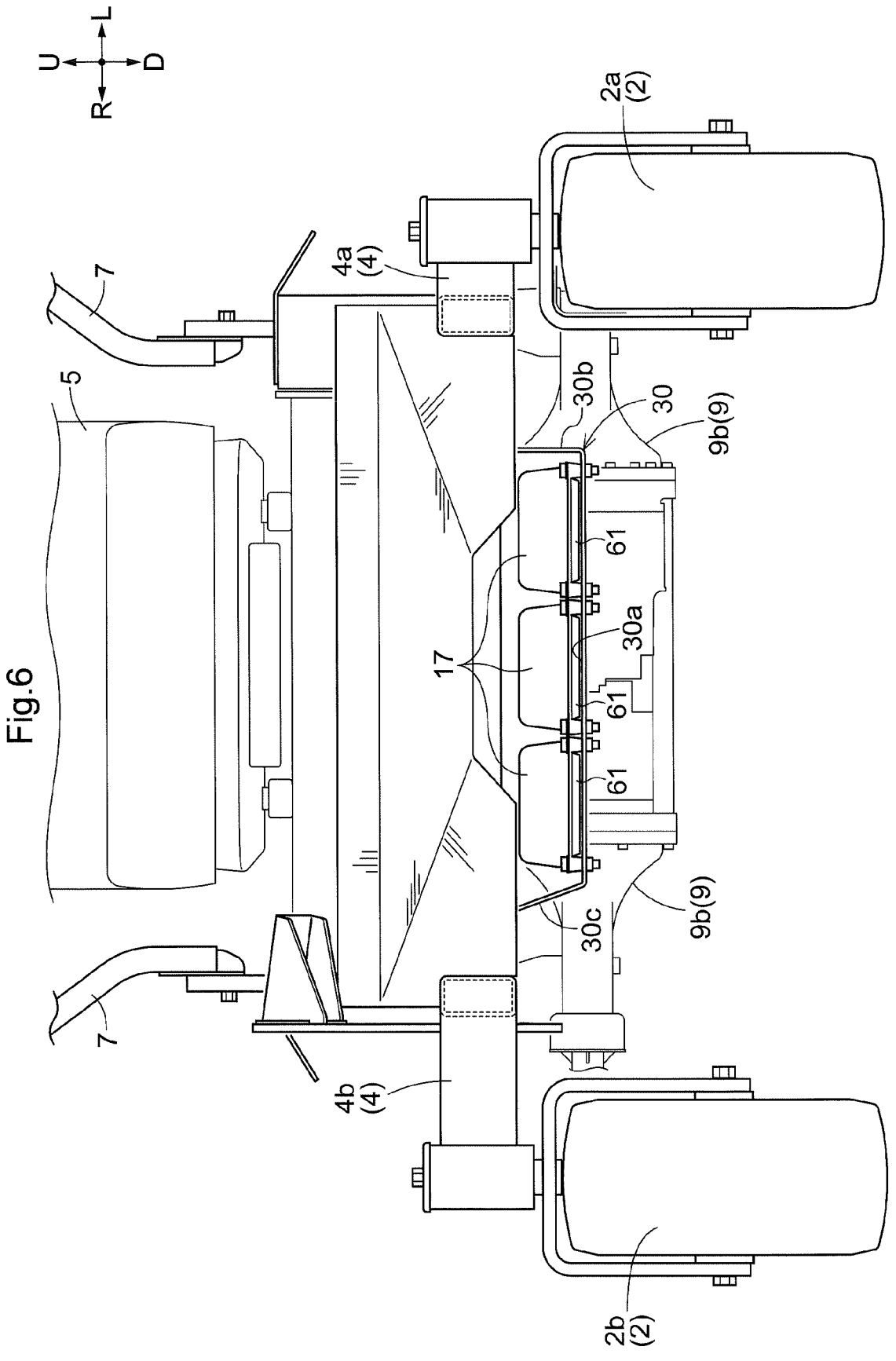
FIG. 6 is a front view of elements supporting controllers for work motors.

As illustrated in FIG. 5, the support member 30 is disposed below the battery 20 and fixed to the body 1. As illustrated in FIG. 6, the support member 30 includes a support section 30a, a left wall 30b, and a right wall 30c. The support section 30a supports the controllers 17.

As illustrated in FIG. 2, the support section 30a has three openings 31 through which the respective lower faces of the controllers 17 are exposed downward. In a case where the controllers 17 each include a heat sink section 61 for discharging heat at a lower face thereof, exposing the heat sink section 61 downward through the corresponding opening 31 cools the controller 17 efficiently. The controllers 17 are forward of the drive wheel motors 9, which are configured to drive the respective drive wheels 3, and do not coincide with the mower cover 13 as viewed in the up-down direction.

As illustrated in FIG. 5, the left wall 30b extends upward from the left end of the support section 30a. The left wall 30b includes a front portion coupled to the first plate 22a and a back portion coupled to the third plate 22c.

As illustrated in FIG. 2, the right wall 30c is similar to the left wall 30b; it includes a front portion coupled to the first plate 22a and a back portion coupled to the third plate 22c. The support member 30 is thus coupled to two plates 22. As illustrated in FIG. 6, the left wall 30b extends upward substantially vertically, whereas the right wall 30c is so inclined that a portion farther upward is farther to the right. The support member 30 includes no front wall or back wall, and is open on the front side and the back side.

Configurations of Motors for Driving Drive Wheels and Controller

As illustrated in FIG. 2, the drive wheel motors 9, namely the motors 9a and 9b, are disposed below the battery 20 and fixed to the second plate 22b and the third plate 22c. The drive wheel motors 9 are each drivable on electric power from the battery 20.

The electric mower includes two controllers 40 configured to control the respective motors 9a and 9b. In other words, the drive wheels 3 (namely, the left rear wheel 3a and the right rear wheel 3b), the drive wheel motors 9 (namely, the motor 9a and the motor 9b), and the controllers 40 form two combinations. The controllers 40 for the present embodiment are each an inverter configured to convert electric current from the battery 20 into a three-phase alternating current with a predetermined frequency and supply the alternating current to the corresponding one of the motors 9a and 9b, which is thereby driven in accordance with the frequency. The battery 20, the controllers 40, and the drive wheel motors 9 are connected to one another with use of a harness or the like (not illustrated in the drawings).

As illustrated in FIG. 3, the controllers 40 are between the side walls 21b of the cover 21 and on respective opposite sides in the direction of the width of the electric mower. The controllers 40 are each between the battery 20 and the corresponding one of the side walls 21b. The controllers 40 are each backward of a lower end portion of the ROPS 8.

As illustrated in FIG. 5, the side walls 21b are each a plate member 41 positioned in correspondence with the corresponding one of the controllers 40. The plate member 41 has an opening 42 for cooling the controller 40, and includes a dust preventer plate 43 configured to prevent suction of dust through the opening 42. The opening 42 has (i) a front end forward of the front end of the controller 40 and (ii) a back end backward of the front end of the controller 40.

Forming the opening 42 and the dust preventer plate 43 involves cutting a slit at a central portion of the plate member 41 in the shape of a substantial U turned by 90 degrees toward the front side and bending the slit portion at the straight line connecting the upper ends of the U. The opening 42 and the dust preventer plate 43 are thus integral with the plate member 41. The dust preventer plate 43 is connected to the front edge of the opening 42 and so inclined that a portion farther backward is farther apart from the opening 42 (see FIG. 2).

In a case where the controllers 40 each include a heat sink section 62 for discharging heat, the heat sink section 62 faces the opening 42 and is exposed through the opening 42. This cools the controller 40 efficiently. The holder device 16, which is configured to temporarily hold the mower unit 10 at its lifted position, is forward of that one of the plurality of (for the present embodiment, two) controllers 40 which is on the left.

Alternative Embodiments

The description below deals with example alternatives to the embodiment described above.

(1) The embodiment described above under "Detailed Description of the Invention" is an example including a ROPS 8. The present invention is, however, not limited to such a configuration, and may omit the ROPS 8.

(2) The embodiment described above under "Detailed Description of the Invention" is an example including four plates as the two or more plates 22. The present invention is, however, not limited to such a configuration, and may include two or three plates or five or more plates as the two or more plates 22.

(3) The embodiment described above under "Detailed Description of the Invention" is an example in which the second plate 22b and the third plate 22c are each provided with elastic members 23. The present invention is, however, not limited to such a configuration, and may be configured such that the first plate 22a and the fourth plate 22d are each provided with elastic members 23 or that no plates are provided with elastic members 23.

(4) The embodiment described above under "Detailed Description of the Invention" is an example in which the fourth plate 22d includes a battery support section 22da, a hitch support section 22db, and an intermediate section 22dc. The present invention is, however, not limited to such a configuration, and may be configured such that the fourth plate 22d is rectangular similarly to the other plates such as the first plate 22a. The fourth plate 22d may, in that case, extend from the left frame section 4a to the right frame section 4b.

(5) The embodiment described above under "Detailed Description of the Invention" is an example in which the ROPS 8 includes a cross member 15. The present invention is, however, not limited to such a configuration, and may be configured such that the ROPS 8 does not include a cross member 15.

(6) The embodiment described above under "Detailed Description of the Invention" is an example including a holder device 16. The present invention is, however, not limited to such a configuration, and may omit the holder device 16.

(7) The embodiment described above under "Detailed Description of the Invention" is an example including a dust preventer plate 43 at the opening 42. The present invention is, however, not limited to such a configuration, and may omit the dust preventer plate 43.

(8) The embodiment described above under "Detailed Description of the Invention" is an example in which the dust preventer plate 43 is so inclined that a portion farther backward is farther apart from the opening 42. The present invention is, however, not limited to such a configuration, and may be configured such that the dust preventer plate 43 is, for instance, parallel to the opening 42.

(9) The embodiment described above under "Detailed Description of the Invention" is an example in which the controllers 40 are each backward of a lower end portion of the ROPS 8 and in which the opening 42 has (i) a front end forward of the front end of the controller 40 and (ii) a back end backward of the front end of the controller 40. The present invention is, however, not limited to such a configuration, and may be configured, for instance, such that the controllers 40 are each forward of a lower end portion of the ROPS 8 and that the opening 42 has a front end backward of the back end of the controller 40.

(10) The embodiment described above under "Detailed Description of the Invention" is an example including two combinations of drive wheels 3, drive wheel motors 9, and controllers 40. The present invention is, however, not limited to such a configuration, and may include one combination of the above or three or more combinations of the above.

(11) The embodiment described above under "Detailed Description of the Invention" is an example in which the support member 30 has openings 31. The present invention is, however, not limited to such a configuration, and may be configured such that the support member 30 has no openings 31.

(12) The embodiment described above under "Detailed Description of the Invention" is an example in which the controllers 17 are arranged in the direction of the width of the electric mower. The present invention is, however, not limited to such a configuration, and may be configured such that the controllers 17 are arranged otherwise such as in the direction of the length of the electric mower.

(13) The embodiment described above under "Detailed Description of the Invention" is an example in which the controllers 17 and the controllers 40 are each an inverter. The present invention is, however, not limited to such a configuration, and may be configured such that the controllers 17 and the controllers 40 are each another electric current converter.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

REFERENCE SIGNS LIST

4 Body frame
4a Left frame section
4b Right frame section
4c Back end section
15 Cross member
20 Battery
22 Plate
22a First plate
22b Second plate
22c Third plate
22d Fourth plate
22da Battery support section
22db Hitch support section
22dc Intermediate section
23 Elastic member

The invention claimed is:

1. An electric mower, comprising:
   a wheel;
   a body frame including a right frame section and a left frame section and supported by the wheel on ground;
   a battery between the right frame section and the left frame section in a plan view;
   a plurality of plates supported by the body frame, spaced from each other in a front-back direction of the electric mower, and supporting the battery from below;
   the body frame includes a back end section coupling a back end portion of the right frame section to a back end portion of the left frame section, and
   a rearward most plate of the plurality of plates includes:
      a battery support section extending forward from the back end section;
      a hitch support section extending backward from the back end section; and
      an intermediate section disposed between the battery support section and the hitch support section and over the back end section.

2. The electric mower according to claim 1, further comprising:
   a rollover protection structure fixed to the body frame at a position,
   wherein the plurality of plates include a first plate forward of the position and a second plate backward of the position.

3. The electric mower according to claim 2, wherein the plurality of plates further include a third plate between the first plate and the second plate.

4. The electric mower according to claim 3, wherein the plurality of plates further include a fourth plate at a back end portion of the body frame.

5. The electric mower according to claim 4, wherein the battery is fixed to at least either of the second plate and the third plate with an elastic member in-between.

6. The electric mower according to claim 5, wherein the battery is fixed to the first plate and the fourth plate with no elastic member in-between.

7. The electric mower according to claim 2, wherein the rollover protection structure includes:
   a right vertical section fixed to the right frame section;
   a left vertical section fixed to the left frame section; and
   a cross member coupling a lower portion of the right vertical section to a lower portion of the left vertical section.

8. The electric mower according to claim 7, further comprising:
   a driver's seat,
   wherein the battery is in a space extending from respective back end portions of the right frame section and the left frame section to below the driver's seat and surrounded by the cross member and the plurality of plates.

9. The electric mower according to claim 1, further comprising:
   a driver's seat,
   wherein the battery is in a space extending from respective back end portions of the right frame section and the left frame section to below the driver's seat.

10. The electric mower according to claim 1, further comprising:
   a mower unit disposed below the battery and capable of being lifted and lowered.

11. The electric mower according to claim 10, wherein the battery is disposed toward a first side in a left-right direction of the electric mower, the electric mower further comprises a holder device disposed between the battery and the body frame on a second side in the left-right direction and configured to temporarily hold the mower unit at a lifted position.

12. An electric mower, comprising:

a wheel;

a body frame including a right frame section and a left frame section and supported by the wheel on ground;

a battery between the right frame section and the left frame section in a plan view;

a plurality of plates supported by the body frame, spaced from each other in a front-back direction of the electric mower, and supporting the battery from below; and a rollover protection structure fixed to the body frame at a position;

wherein the plurality of plates include a first plate forward of the position and a second plate backward of the position.

\*    \*    \*    \*    \*